No. 684,673. Patented Oct. 15, 1901.
C. S. CLARK.
NUT LOCK.
(Application filed July 1, 1901.)
(No Model.)
Fig. 1.
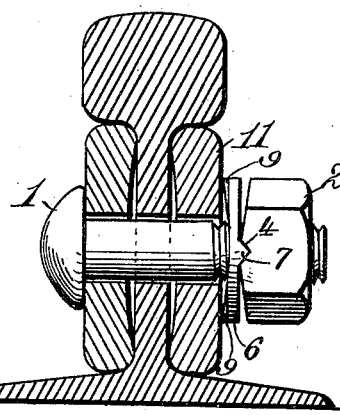
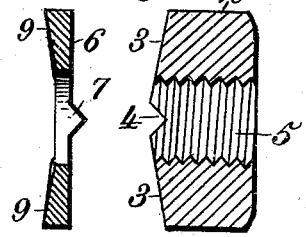
Fig. 2.
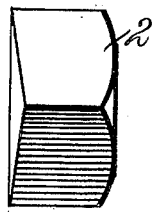
Fig. 3.
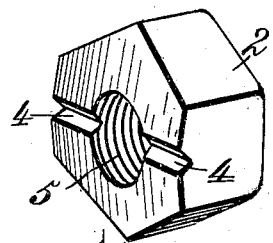
Fig. 4.
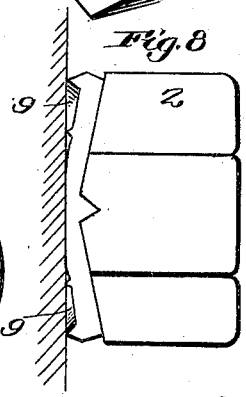
Fig. 7.
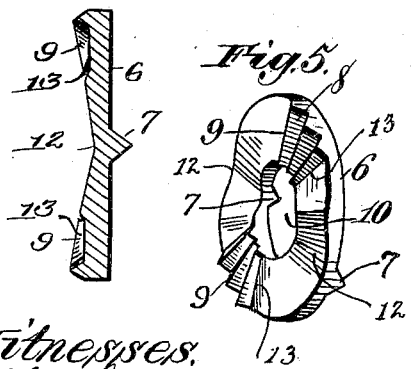
Fig. 5.
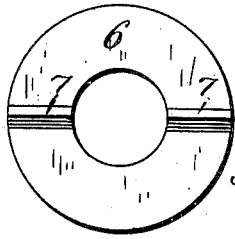
Fig. 6.
Fig. 8.
Witnesses
Inventor,
Cornelius S. Clark,
By James L. Norris,
Att'y.

UNITED STATES PATENT OFFICE.

CORNELIUS S. CLARK, OF NORFOLK, VIRGINIA, ASSIGNOR OF ONE-HALF TO CHARLES M. BARNETT, OF SAME PLACE.

NUT-LOCK.

SPECIFICATION forming part of Letters Patent No. 684,673, dated October 15, 1901.

Application filed July 1, 1901. Serial No. 66,756. (No model.)

*To all whom it may concern:*

Be it known that I, CORNELIUS S. CLARK, a citizen of the United States, residing at Norfolk, in the county of Norfolk and State of Virginia, have invented new and useful Improvements in Nut-Locks, of which the following is a specification.

This invention relates to nut-locks; and it has for its object to provide certain new and useful improvements upon the nut-lock shown and described in my application for patent, Serial No. 62,298, filed May 28, 1901. In the aforesaid application I provide on one face of the nut an inwardly-extending annular boss or collar which constitutes the bearing-face for the nut and which also serves to carry and support the washer; but I have found that an equally efficient and less expensive nut-lock especially adapted to certain classes of work may be formed or provided by dispensing with the aforesaid annular boss or collar and by slightly changing the construction of the washer shown in my said pending application, and it is therefore the prime object of this invention to greatly simplify and improve the construction of parts in such a nut-lock and to reduce the cost of manufacture.

Briefly and generally stated, the invention comprises a nut of ordinary construction in all respects, except that its inner or bearing end is provided with two oppositely and outwardly inclined or beveled faces and a transverse groove arranged across the end of the nut at the highest point thereof, or, in other words, the said groove intersects the apex of the two outwardly-inclined faces. Coöperating with the said nut is a yieldable washer provided on one side with a centrally-arranged transverse rib adapted to interlock with the transverse groove in the nut, and on its other side said washer is provided with oppositely-disposed engaging faces or projections of novel construction, which latter are arranged at right angles to the transverse rib, the parts being combined and arranged in such manner that when the rib of the washer is interlocked with the groove in the nut the said engaging faces or projections on the washer will be disposed opposite the inclined or beveled faces on the nut, whereby when the nut is screwed upon a bolt in use the said engaging projections will grip or bite upon the part being bolted in a yielding manner, and thus effect a more secure locking of the nut.

In order to enable others to understand, make, and use my said invention, I will now proceed to describe the same in detail, reference being had for this purpose to the accompanying drawings, wherein—

Figure 1 is a sectional view showing my improved nut-lock applied in locking position to a railroad-rail. Fig. 2 is a detail sectional view of the nut and washer, the parts being detached. Fig. 3 is a side elevation of my improved nut, the view being taken at right angles to Fig. 2. Fig. 4 is a perspective view of the nut, looking at the inner or bearing face thereof. Fig. 5 is a similar view of the washer, and Fig. 6 is a plan view looking at the opposite side or face of the washer. Fig. 7 is an end view of the washer in its normal state. Fig. 8 is a similar view showing the shape the washer assumes when in its set-up or locking position.

Referring now to the acccompanying drawings, the reference-numeral 1 designates a bolt of ordinary construction, to the threaded end of which my improved nut and washer are applied. The nut 2 is likewise of ordinary construction, except that its inner or bearing end is inclined or beveled off outwardly from a line taken transversely across its center and in opposite directions to provide the two outwardly-inclined faces or walls 3 3, and extending transversely across the said beveled end of the nut and at the highest point thereof is a transverse groove 4, preferably of V shape in cross-section, although this particular cross-sectional shape is not absolutely essential. From the construction shown it will be seen that the transverse groove 4 intersects the threaded opening 5 passing through the nut and is interposed between the inner adjacent ends of the said oppositely-inclined walls 3.

My improved yieldable washer 6 comprises a metal disk or annulus of spring metal having a centrally-arranged transverse rib 7 on one face thereof V shape in cross-section and corresponding to the V-shaped groove 4 in the nut, the arrangement of the groove and rib being such that when the parts are placed one upon the other, as in use, they will be interlocked and will turn together. The opposite side or face of the washer is provided with oppositely-disposed engaging faces or projections that are arranged at right angles to the rib 7. As shown, these projections each consist of a plurality of radially-disposed V-shaped walls 8, constituting at the apex of each a biting-ridge 9, although a single ridge arranged on each side of the opening 10 through the washer may be employed if desired. The ridges 9 are inclined inwardly from the outer edge of the washer toward the center thereof, or, in other words, they lie at an angle to the side or face of the washer, so that the surface contact of said ridges will vary according to the pressure brought to bear upon the same by the nut, and a greater yielding area of the washer will thus be secured.

The two opposite faces of the washer between the biting-ridges 9 are slightly dipped or concaved, as more clearly shown at 12, Fig. 7, the lower or deepest portions of these dips being directly opposite the V-shaped walls 8 on the other face of the washer, the object of this construction being that when the nut is screwed tightly home, so as to compress or bow the washer, these two concaved portions will be flattened out to provide two flat or straight bearing-faces, as shown in Fig. 8, which faces will be in line with the edges of the ridges 9 and act in conjunction therewith, thus providing four distinct bearing-faces for the washer when the latter is in its set-up position, two of which faces are biting-faces.

It will be seen that the dipped or concaved portions 12 of the washer are formed by making the opposite faces of the washer between the biting-ridges 9 waving or undulating, the opposite ends of these undulations being dipped, as at 13, and terminating at the base of the biting-ridges 9, as shown.

In use, as shown in Fig. 1, the washer 6 is first placed over the bolt 1, with the engaging projections or ridges 9 bearing against the fish-plate 11. The nut 2 is then screwed upon the bolt and brought up against the washer, the rib 7 and groove 4 being made to interlock, so that as the nut is screwed home the washer will be caused to turn therewith. When the parts are in this position, it will be seen that the engaging projections or ridges 9 lie opposite the inclined or beveled walls 3 on the nut, said walls thus permitting the washer to yield as the nut is being screwed home upon the bolt, and a yielding action of the washer upon the nut is thereby obtained.

In the present construction I have shown the nut as being provided with a transverse groove 4 and the washer with a rib 7, which form the interlocking means for these parts; but it will be obvious that the location of the rib and groove on the nut and washer, respectively, may be reversed and the same result secured, although for cheapness in construction I prefer to make the parts as shown.

What I claim, and desire to secure by Letters Patent, is—

1. A nut-lock comprising a nut and a coöperating washer, said nut being provided on its inner end with two oppositely and outwardly inclined walls and a central transverse groove interposed between the inner adjacent ends of said inclined walls, combined with a washer provided on one side or face with a centrally-arranged transverse rib adapted to interlock with the groove in the nut and on its other side or face with oppositely-arranged engaging projections, said projections being arranged at right angles to the transverse rib, the parts being combined and operating substantially as described.

2. A nut-lock comprising a nut provided on one end with two oppositely and outwardly inclined walls extending from a central line taken transversely across the inner end of the nut, combined with a washer provided on one side with means for locking the same to the nut to cause the parts to turn together, and oppositely-arranged engaging projections on the other side of the washer, said projections being disposed in line with the outwardly-inclined walls of the nut, substantially as described.

3. A nut-lock comprising a nut provided on one end with two outwardly-inclined walls extending from a central line taken transversely across the inner end thereof, combined with a coöperating yieldable washer, the said nut and washer being provided with interlocking means, and the washer being provided on its inner face with V-shaped engaging ridges, said ridges being inclined inwardly toward the center of the washer, substantially as described.

4. A nut-lock comprising a nut provided on one end with a centrally-arranged transverse groove and two outwardly-extending inclined walls leading from said transverse groove to the outer edges of the nut, combined with a coöperating yieldable washer provided on one face with a transverse rib adapted to interlock with the groove in the nut and on its opposite face with outwardly-extending engaging projections, said projections being arranged at right angles to the said rib and disposed opposite the inclined walls of the nut, substantially as described.

5. A nut-lock comprising a nut provided on one end with a centrally-arranged transverse groove and two outwardly-extending inclined walls leading from said groove to the outer edges of the nut, combined with a coöperating yieldable washer provided on one face with a transverse rib adapted to interlock with the groove in the nut and on its other face with a plurality of oppositely-disposed projections constituting engaging ridges, said ridges being inclined and converging toward the center of the nut, substantially as described.

6. A nut-lock comprising a nut provided on one end with two oppositely and outwardly inclined walls extending from a central line taken transversely across the inner end of the nut, combined with a washer provided on one side with means for locking the same to the nut to cause the parts to turn together, the opposite side of the washer being provided with oppositely-arranged engaging projections, said projections being disposed in line with the outwardly-inclined walls of the nut, and the two opposite faces of the washer between said projections being slightly dipped or concaved, substantially as and for the purpose set forth.

7. A washer for nut-locks provided on one side with means for locking the same to a nut, and on its other side with oppositely-disposed engaging projections, the two opposite faces or walls of the washer between said projections being slightly dipped or concaved, substantially as described.

In testimony whereof I have hereunto set my hand in presence of two subscribing witnesses.

CORNELIUS S. CLARK.

Witnesses:
CALVERT ROGERS DEY,
GEO. P. DYSON.